(12) United States Patent
Gibson et al.

(10) Patent No.: US 11,736,466 B2
(45) Date of Patent: Aug. 22, 2023

(54) ACCESS CONTROL SYSTEM

(71) Applicant: BIOCONNECT INC., Toronto (CA)

(72) Inventors: Courtney Ryan Gibson, Toronto (CA); Robert Douglas, Toronto (CA)

(73) Assignee: BIOCONNECT INC., Toronto (CA)

( * ) Notice: Subject to any disclaimer, the term of this patent is extended or adjusted under 35 U.S.C. 154(b) by 334 days.

(21) Appl. No.: 17/026,144

(22) Filed: Sep. 18, 2020

(65) Prior Publication Data

US 2021/0084021 A1 Mar. 18, 2021

Related U.S. Application Data

(60) Provisional application No. 62/901,978, filed on Sep. 18, 2019.

(51) Int. Cl.
*H04L 9/40* (2022.01)
*H04W 12/47* (2021.01)
*H04W 12/069* (2021.01)

(52) U.S. Cl.
CPC ...... *H04L 63/0807* (2013.01); *H04L 63/0853* (2013.01); *H04L 63/10* (2013.01); *H04W 12/069* (2021.01); *H04W 12/47* (2021.01)

(58) Field of Classification Search
None
See application file for complete search history.

(56) References Cited

U.S. PATENT DOCUMENTS

| 4,531,023 A * | 7/1985 | Levine | G06F 21/31 726/13 |
| 5,892,900 A * | 4/1999 | Ginter | G06F 21/78 726/26 |
| 5,983,266 A * | 11/1999 | Tadman | G06F 15/17306 710/200 |
| 7,181,507 B1 * | 2/2007 | Lavelle | H04W 12/08 707/999.01 |

(Continued)

FOREIGN PATENT DOCUMENTS

| WO | WO-2015140643 A2 * | 9/2015 | G06Q 20/322 |
| WO | WO-2016019474 A1 * | 2/2016 | G07C 9/00309 |
| WO | WO-2019066822 A1 * | 4/2019 | G06F 21/602 |

OTHER PUBLICATIONS

Smith et al "Magnetic Stripe Card-Integrated Identification Technology," Security Science, Science Direct, pp. 1-20 (Year: 2013).*

(Continued)

*Primary Examiner* — Luu T Pham
*Assistant Examiner* — James J Wilcox
(74) *Attorney, Agent, or Firm* — Norton Rose Fulbright Canada LLP

(57) ABSTRACT

A device is described that includes a first microprocessor configured for interfacing with a digital access control backend, and a second microprocessor configured for dedicated communications with an access control manager device backend. The first microprocessor is a master device that controls the operation of the second microprocessor as a secondary device. The proposed device is configured for (Continued)

operation of the first microprocessor and the second microprocessor at low clock speeds and to maintain a hash segregation between locally received data sets and data sets transmitted to an external authentication system.

19 Claims, 8 Drawing Sheets

(56) References Cited

U.S. PATENT DOCUMENTS

| | | | | |
|---|---|---|---|---|
| 7,769,996 | B2* | 8/2010 | Randle | G06Q 20/388 |
| | | | | 713/153 |
| 8,625,796 | B1* | 1/2014 | Ben Ayed | H04W 12/64 |
| | | | | 380/258 |
| 8,639,625 | B1* | 1/2014 | Ginter | H04N 21/4405 |
| | | | | 705/50 |
| 8,881,304 | B2* | 11/2014 | Vrielink | H04L 63/10 |
| | | | | 726/28 |
| 9,369,443 | B1* | 6/2016 | Sinor | H04L 63/102 |
| 9,521,031 | B2* | 12/2016 | Jonker | H04L 67/535 |
| 10,021,141 | B2* | 7/2018 | Wong | H04L 67/143 |
| 10,037,525 | B2* | 7/2018 | Neafsey | G07C 9/00309 |
| 10,042,808 | B1* | 8/2018 | Kulkarni | G06F 13/1673 |
| 10,685,351 | B1* | 6/2020 | Sorbello | G06F 16/9535 |
| 10,992,678 | B1* | 4/2021 | Gilman | H04L 63/10 |
| 10,997,577 | B2* | 5/2021 | Vyas | G06Q 20/3224 |
| 11,297,050 | B2* | 4/2022 | Wasily | H04L 9/3218 |
| 2001/0051996 | A1* | 12/2001 | Cooper | H04L 63/0823 |
| | | | | 705/26.1 |
| 2001/0056508 | A1* | 12/2001 | Arneson | H04L 63/10 |
| | | | | 719/318 |
| 2002/0029350 | A1* | 3/2002 | Cooper | H04L 63/0823 |
| | | | | 705/1.1 |
| 2002/0087868 | A1* | 7/2002 | King | G06K 13/085 |
| | | | | 713/185 |
| 2005/0037747 | A1* | 2/2005 | Geary | H04L 63/10 |
| | | | | 455/456.1 |
| 2005/0081040 | A1* | 4/2005 | Johnson | H04L 9/3231 |
| | | | | 713/176 |
| 2005/0162253 | A1* | 7/2005 | Wilson | H04L 63/10 |
| | | | | 340/5.2 |
| 2005/0188425 | A1* | 8/2005 | Horn | H04L 63/0853 |
| | | | | 726/34 |
| 2005/0210179 | A1* | 9/2005 | Walmsley | G06F 21/445 |
| | | | | 711/3 |
| 2006/0075098 | A1* | 4/2006 | Becker | H04L 63/08 |
| | | | | 709/227 |
| 2006/0187836 | A1* | 8/2006 | Frey | H04L 47/10 |
| | | | | 370/235 |
| 2007/0245369 | A1* | 10/2007 | Thompson | H04L 63/10 |
| | | | | 725/30 |
| 2008/0229389 | A1* | 9/2008 | Singh | H04L 63/101 |
| | | | | 726/3 |
| 2008/0250213 | A1* | 10/2008 | Holt | G06F 11/1666 |
| | | | | 711/159 |
| 2009/0119698 | A1* | 5/2009 | Kuijlaars | G07C 9/28 |
| | | | | 340/5.8 |
| 2009/0164776 | A1* | 6/2009 | Tuoriniemi | G06F 21/10 |
| | | | | 713/158 |
| 2009/0191846 | A1* | 7/2009 | Shi | H04L 63/0861 |
| | | | | 455/411 |
| 2009/0221266 | A1* | 9/2009 | Ohta | H04W 12/082 |
| | | | | 455/411 |
| 2011/0092185 | A1* | 4/2011 | Garskof | H04L 63/083 |
| | | | | 455/411 |
| 2011/0177814 | A1* | 7/2011 | Buchmayer | H04W 48/02 |
| | | | | 455/435.1 |
| 2013/0073859 | A1* | 3/2013 | Carlson | H04L 9/3247 |
| | | | | 713/176 |
| 2013/0145065 | A1* | 6/2013 | Ricci | G06F 3/0484 |
| | | | | 710/241 |
| 2014/0344909 | A1* | 11/2014 | Raji | G06F 21/00 |
| | | | | 726/7 |
| 2015/0038116 | A1* | 2/2015 | Lodeweyckx | H04W 8/18 |
| | | | | 455/411 |
| 2015/0055161 | A1* | 2/2015 | Allison | H04L 63/0853 |
| | | | | 358/1.13 |
| 2016/0019778 | A1* | 1/2016 | Raji | G08B 25/14 |
| | | | | 340/507 |
| 2016/0044043 | A1* | 2/2016 | Bouvet | G06F 21/10 |
| | | | | 726/1 |
| 2016/0156619 | A1* | 6/2016 | Lovelock | H04L 9/3234 |
| | | | | 726/7 |
| 2016/0156632 | A1* | 6/2016 | Rohleder | G06F 21/70 |
| | | | | 726/27 |
| 2016/0164923 | A1* | 6/2016 | Dawes | H04L 63/02 |
| | | | | 709/227 |
| 2016/0219032 | A1* | 7/2016 | Wang | H04L 63/10 |
| 2016/0335443 | A1* | 11/2016 | Ito | H04L 63/083 |
| 2017/0103647 | A1* | 4/2017 | Davis | H04W 12/068 |
| 2017/0228531 | A1* | 8/2017 | Raji | H04L 63/10 |
| 2017/0255787 | A1* | 9/2017 | Geraud | G06F 21/602 |
| 2017/0331828 | A1* | 11/2017 | Caldera | H04L 63/0807 |
| 2017/0364944 | A1* | 12/2017 | Sharma | H04L 63/10 |
| 2018/0004377 | A1* | 1/2018 | Kitchen | H04L 63/0227 |
| 2018/0020003 | A1* | 1/2018 | Ruiz | H04L 63/101 |
| 2018/0091504 | A1* | 3/2018 | Sagi | H04L 63/0861 |
| 2018/0131677 | A1* | 5/2018 | Brickell | H04L 9/3247 |
| 2018/0191720 | A1* | 7/2018 | Dawes | H04L 69/08 |
| 2018/0198788 | A1* | 7/2018 | Helen | H04L 12/2827 |
| 2018/0239349 | A1* | 8/2018 | Rasmussen | G01C 21/3415 |
| 2018/0288053 | A1* | 10/2018 | Falk | H04L 63/1408 |
| 2018/0316665 | A1* | 11/2018 | Caldera | H04L 63/08 |
| 2018/0324158 | A1* | 11/2018 | Brickell | H04L 63/102 |
| 2019/0102538 | A1* | 4/2019 | Gentili | G06F 21/53 |
| 2019/0109818 | A1* | 4/2019 | Baum | G08B 21/182 |
| 2019/0122149 | A1* | 4/2019 | Caldera | H04L 63/102 |
| 2019/0222567 | A1* | 7/2019 | Caldera | H04L 63/0876 |
| 2019/0289011 | A1* | 9/2019 | Kamiya | H04L 63/0428 |
| 2019/0289039 | A1* | 9/2019 | Kamiya | H04L 63/0823 |
| 2019/0319987 | A1* | 10/2019 | Levy | H04L 41/20 |
| 2019/0325677 | A1* | 10/2019 | Lingala | G07C 9/00309 |
| 2019/0327235 | A1* | 10/2019 | Brickell | H04L 9/3247 |
| 2019/0372758 | A1* | 12/2019 | Tevosyan | H04L 9/0891 |
| 2019/0377683 | A1* | 12/2019 | Polychroniou | G06F 12/0897 |
| 2020/0106784 | A1* | 4/2020 | Dawes | H04W 12/08 |
| 2020/0280573 | A1* | 9/2020 | Johnson | G06N 20/00 |
| 2021/0058283 | A1* | 2/2021 | Rivera | H04L 45/22 |
| 2021/0110027 | A1* | 4/2021 | Stohr | H04L 9/3234 |
| 2021/0158468 | A1* | 5/2021 | Gregoryona | G06Q 50/30 |
| 2021/0281977 | A1* | 9/2021 | Ebner | H04W 4/029 |
| 2022/0222637 | A1* | 7/2022 | Tax | G06Q 20/202 |
| 2023/0039085 | A1* | 2/2023 | Weller | G06F 21/34 |

OTHER PUBLICATIONS

Kundu et al. "Low EMI Design of a Microprocessor Based Password Access Control System—A Case Study," Electronic Research & Development Centre of India, SEMCEI, pp. 311-314 (Year: 1997).*

Clifton et al "A Microprocessor Design for Multilevel Security," IEEE, pp. 194-198, (Year: 1988).*

* cited by examiner

ACCESS CONTROL SYSTEM

CROSS REFERENCE

This application is a non-provisional of, and claims all benefit, including priority to U.S. Application No. 62/901,978, filed Sep. 18, 2019, entitled "ACCESS CONTROL SYSTEM", incorporated herein by reference in its entirety.

This application is related to U.S. application Ser. No. 16/683,858, filed Nov. 14, 2019, entitled "SECURE COMMUNICATION PLATFORM, incorporated herein by reference in its entirety.

FIELD

Embodiments of the present disclosure relate to the field of access control, and more specifically, embodiments relate to devices, systems and methods for access control using reduced computing capability computing devices (such as microprocessors and/or microcontrollers).

INTRODUCTION

Access control management systems (ACMs) are often configured for usage on a legacy communications protocol. Legacy access control systems, in some instances, rely on the physical security provided by a direct, hard-wired connection (e.g., Wiegand, OSDP, etc.) between the components of the access control system and the associated access control readers (e.g., RFID card readers, mobile credential readers, PIN pads, etc.). For example, the Wiegand interface is a wiring protocol that utilizes electrical effects that occur during a short timeframe for signalling (e.g., when a magnetic strip card is presented to a reader device, a series of bits are signalled through modifications of electric current during switches of magnetic state, or via radio frequency identification (RFID) protocols that are used to generate corresponding electrical signals, for example, through induction induced on electronic components of an access badge).

Legacy ACMs are prevalent in facility securement. These legacy ACMs typically operate with a set of corresponding access control tokens which are issued to individuals who are authorized to access controlled resources (e.g., enter doors, open data server cabinets, generate authenticated login sessions at computer terminals). The access control tokens can include access fobs (e.g., storing a code accessible by near field communications or inductive coupling). The legacy existing approach presents significant limitations, both in the requirement to run dedicated wiring throughout the building, and that the maximum typical operating distance is less than 100 meters.

While the legacy systems may be outdated, the fixed cost of installation has already been incurred and it may be useful to retrofit and modernize the existing infrastructure.

SUMMARY

It may be desirable to upgrade or retrofit legacy access control devices such that improved digital rules-based systems can interact with the legacy access control devices.

As described herein, the upgrade or retrofit is not trivial as technical problems persist in respect of technical signalling challenges. Furthermore, from a practical perspective, the upgrade or retrofit is potentially costly as a large number of devices may be needed, and there may be a desire to utilize lower cost and complexity by incorporating low power/low clock speed microprocessors.

While there may be legacy wireless solutions, they typically rely on relatively short-range radio protocols, such as IEEE 802.15, which can eliminate some of the overhead of running existing wiring, but further-reduces the maximum distance between access control hubs and the associated access control readers to a maximum typical operating distance of 10-20 meters. Such a short distance is not desirable and limits the potential application of the system.

A retrofit improvement would allow, for example, technology-based restrictions, such as the requirement to have dedicated wiring and a short maximum operating distance, to be overcome. The retrofit improvement includes intercepting signals bound for or from legacy systems, and adding improved infrastructure to utilize, combine, expand, and/or add functionality to the legacy systems.

For example, the legacy systems may be coupled with modernized digital backend systems that can provide additional layers of security, including beacon based security, mobile credentials (e.g., those stored on smartphones), integration with directory services, dynamic security shifts (e.g., raised security requirements responsive to a detected breach of a similar technology at an unrelated site detected through news alerts), dynamic failovers (e.g., communications outage, power outage, natural disaster), among others.

The retrofit can further allow the overcoming of prior technological barriers, such as wire-based distance limitations (e.g., adding a remote backcountry toolshed accessible to repair technicians to a security infrastructure to be monitored alongside city-based premises), among others. The retrofit also adds the potential for non-security based integration extensibility, such as adding well-ness checks (e.g., temperature monitoring), well-ness declarations, travel-based declarations, and verification of same prior to provisioning access, for example, by cross-referencing location-based data or personnel records.

Other potential retrofits include safety-based retrofits (e.g., prior to long-haul truck driver gaining access to a vehicle, alcohol testing via a breath test, or rest/sleep tracking determinations may be required to aid in improving transportation safety). Retrofits can extend functionality in respect of specific use cases, for example, where the identity can be extended to activities associated with secured elements, such as digital evidence lockers adapted for anti-tampering and improved monitoring for law enforcement.

However, several technical challenges arise that are addressed by various embodiments described herein. A technical challenge that arises with using legacy communications protocols is that the speed at which the series of bits are signalled through modifications of electric current during the switches of magnetic states requires high timing accuracy by a coupled microprocessor. For example, the width and timing of pulses can be critical.

The technical signalling problem associated with legacy systems raises due to legacy access control tokens transmitting their payload asynchronously, for example, via a one-way RFID protocol. This means that the transmitting RFID card, keyfob or similar device is unaware of the receiver's state, and, in particular, it is unaware of the receiver's immediate willingness or ability to receive the transmitted signal, and the receiver is unable to ask the transmitter to pause, repeat or change the speed of the transmission. If the receiver is not immediately able to receive every transmitted value, then one or more parts of the transmission will be lost and unrecoverable (e.g., unable to interpret or incorrectly interpreted). These errors in reception can cause the legacy access control system to either deny entry to an otherwise-authorized individual, could incorrectly raise monitoring alarms related to invalid access attempts.

For low power microcontrollers (e.g., those designed to be operated using portable batteries or in regions where power is not steadily available), the controllers have slower clock speeds (e.g., 160 MHz or 16 MHz). As the period of a clock cycle is the inverse of the clock speed, the clock cycles of the low power microcontrollers can be computationally long.

While a high power processor can provide enough head room, the long clock cycles of the low power microcontrollers causes a technical problem in relation to achieving the high timing accuracy required by legacy communications protocols, especially where the low power microcontrollers are conducting other functions or the protocol requires narrow pulses (e.g., to provide voltage pulldowns to signal specific bits at approximately 50 µs—a single missed pulldown could result in an error). Legacy access control systems make use of door controllers that typically service many readers, which means that interface devices such as this must have the capability of receiving multiple, simultaneous signals.

With typical clock speeds and door configurations, this means that a low-power microprocessor would be required to respond to any incoming bits within a small number of clock cycles; during this time the microcontroller must detect a level-change on the Wiegand input, process a software interrupt, sample its ADC to determine the level of the line ("0" or "1"), store the result in an internal data structure, reset the software interrupt settings, and return from the interrupt handler.

Processing simultaneous access control events (e.g., two people scanning their access control cards at close to the same time) can consume all available clock cycle budget, leaving no additional capacity for the microcontroller to manage the other device requirements, such as managing network communication, eventing monitoring, encryption, etc.

When a low power microcontroller is tasked with multiple simultaneous operations requiring use of on-board computing resources, computational tasks may be delayed in execution, and these delays in execution (e.g., due to execution command congestion) can lead to deleterious effects in respect of generating electrical signals for communication with the legacy protocols or devices due to mistiming. When a signal is mistimed, it can be read incorrectly at the receiving device, and incorrect results may occur (e.g., denial of access to validated individual), as the signalling does not include any error-recovery bits that can be used to recover any lost bits.

Another technical problem that could arise in relation to digital integration with improved external cloud-based access control systems includes a need to avoid transmitting plaintext or practically reversible card identifiers or facility identifiers to the external access control systems. By avoiding transmitting plaintext or practically reversible card identifiers or facility identifiers, a potential attack vector is reduced as a malicious attacker cannot use information obtained through intercepting the network connection or through vulnerabilities at the external access control systems. This technical problem can be addressed by the low power microcontrollers described in various embodiments.

As described in various embodiments herein, a microcontroller circuit and corresponding circuit topologies, computing systems, methods of operation, and computer program products affixed in the form of non-transitory computer readable memories storing machine-interpretable instruction sets for execution on one or more computer processors are provided.

A proposed microcontroller circuit, in accordance with a first aspect, includes a first microprocessor configured for interfacing with a digital access control backend, and a second microprocessor configured for dedicated communications with an access control manager device backend.

This proposed approach encompasses four main signaling requirements: (i) it has to receive the incoming signal from a legacy access control token (for example, an RFID card, keyfob or similar device); (ii) it has to transform the signaled token value into a secure form, suitable for remote digital processing (e.g., via secure, one-way hashing, such as HMAC-SHA256) and then securely transmit that event information to the remote digital server (for example, via TLS-secured MQTT protocol); (iii) it has to receive back a secure authentication confirmation from the remote digital server, which must be decrypted, decoded and processed (for example, via TLS-secured MQTT protocol); and, (iv) it must then recreate and transmit the original legacy access control token onwards to the legacy access control system, using the precise format and signal timing that the legacy access control system is configured to accept.

In some embodiments, legacy access control devices are not only adapted for retrofit to enable interoperability with improved digital systems, but the access control is extended in respect of adding interconnections to remote devices that could otherwise be impractical to connect. For example, access control devices can be extended to vehicles, remote facilities (e.g., an equipment shed that would otherwise be impractical to connect via physical wiring), among others.

The first microprocessor (e.g., an ESP32 system on a chip microprocessor) is a primary (e.g., master) device that controls the operation of the second microprocessor (e.g., an ATMega168 microcontroller having general purpose input/output pins) as a secondary device adapted to receive and process instructions received from the primary device.

In particular, the first microprocessor is adapted for conducting digital communications protocols and credential transformation operations. The second microprocessor emulates signals based on command instructions received from the first microprocessor, the emulated signals used for communicating with a legacy ACM system. The first microprocessor, in some embodiments, has greater computing capability than the second microprocessor. Because the second microprocessor is dedicated to communications across the signalling protocol, its ability to provide correctly timed signals is improved.

To address the signalling problem, wherein a multitasking receiver is required to be immediately ready to receive an incoming signal at any point in time, the proposed design of an embodiment provides one microcontroller that is always ready to process, decode and validate the incoming signals, and generate the timing-dependent outgoing signals, while the other microprocessor (e.g., secondary microprocessor) is able to handle the remaining work of communication with the remote digital server.

This eliminates the need to build the solution on larger, more-powerful CPUs that would otherwise need to be scaled for peek demand, which is a significant benefit in both the costs associated with higher-spec devices and the power requirements associated with higher-clockrate CPUs (as the power consumption requirements of a CPU scale approximately with the square of the clockspeed, which means that an implementation that requires 2 times the CPU speed will require 4 times the power in order to run the same application, which can significantly limit the application for solutions that are mobile or may not otherwise have access to continuous external power).

A microcontroller system that incorporating the first microprocessor and the second microprocessor provides an interface between access events (e.g., physical or virtual access events) that operate on legacy systems and coupling them to digital backend that provides enhanced user profile/security features. The legacy transaction protocol is translated for two-way communication—in one direction for transmitting access tokens provided by users (e.g., door badging at a panel using a keyfob) and in the other direction for provisioning access (e.g., granting access by releasing a magnetic lock or initiating a secured computer session on a secured graphical user interface). The system may reside on-premises such that data transferred (e.g., facility numbers, card numbers) can be locally stored.

The first microprocessor and the second microprocessor are electronically coupled to one another through a messaging bus, and in some embodiments, an additional interrupt line that operates to enable the second microprocessor to communicate event triggers to the first microprocessor (e.g., instead of inefficiently polling).

An example physical access could be usage for controlling/denying entry into a building when a key card is presented at a reader. The reader can receive a Wiegand signal from the key card (e.g., as a magnetic strip is run across, a series of electrical pulses are generated, or a corresponding RFID signal) and this signal is sent to the secondary microprocessor to decode and then the decoded message is sent to the master microprocessor, which either authenticates locally (in some embodiments) or authenticates by sending a transformed decoded message to an external authentication mechanism (e.g., an external server).

The reader can also receive a Bluetooth signal from a mobile device. Another example access could be usage for controlling/denying connection to a car ignition system. Another example could be usage for reading a keyfob identifier (or some other token) from the car's system. This can be useful in situations where the car already has a legacy keyfob system that has some vulnerabilities or limited utility. As described herein, the car can be extended to be covered in respect of the retrofit system, and car keyfobs can be intercepted and additional verification and authentication is required in respect of security (e.g., adding additional security elements due to prevalence of a suspected relay attack) or non-security-based improvements, such as safety (e.g., alcohol testing) or rest-based requirements (e.g., coupling to a fatigue monitor, such as a smartwatch). Another example includes control of car garage remotes.

Upon receipt of a successful authentication message from the external authentication mechanism, the master microprocessor sends an instruction signal to the secondary microprocessor to generate a corresponding signal for controlling the access control provisioning (e.g., in a legacy communication protocol). By transforming the message such that only a securely-hashed version is sent to the external authentication mechanism, the underlying decoded message is not revealed to the external authentication mechanism. An example virtual access could include controlling/denying secured login into a restaurant cashier terminal when a server presents a key card at a reader coupled to the cashier terminal.

Secure hashing (such as, but not limited to, SHA-AES256) can be used for communications securement. Secure hashing and a secret key can be integrated together, rendering it practically irreversible and anonymized.

The first microprocessor can store local secret keys on-premises, which can be used in conjunction with public keys to be signed and for generation of certificates (e.g., x509 certificates). Accordingly, a hard segregation can be established between the microcontroller system and the external systems.

The system described herein can be used, an in embodiment, as a system for providing interoperable access control between a digital backend authentication system and an access control system, the system comprising an interception device (e.g., having the microcontroller systems) configured to intercept physical access requests received from a sensor and to forward the physical access requests to the digital backend authentication system for validation. A receiver interface can be configured to receive authorization signal from the digital backend authentication system to allow a physical access event to proceed; and a protocol transformation engine can be configured to transform the authorization signal and to transmit a transformed authorization signal to the access control system.

In another aspect, an additional interrupt connection link is established between the first microprocessor and the second microprocessor to allow for interrupt type signals to be transmitted (e.g., to reduce a need to utilize polling, which could be computationally costly and inefficient to operate).

In another aspect, the first microprocessor is coupled to an external authentication mechanism (e.g., external authentication server) and configured to transform received credentials from the second microprocessor. Local credentials (e.g., facility number, card ID number) are transformed (e.g., through the use of secure hashing) prior to communication to the external authentication mechanism.

In particular, the transformation of the local credentials allows the ability to avoidance of sending up plaintext/reversible local credentials to the external authentication mechanism. By sending only transformed credentials, the external authentication mechanism is able to authenticate the associated user profiles without having the ability to observe directly the schema or underlying local access credentials. The secure hashing key is shared between the various on-premises devices—via a secure key-sharing algorithm (e.g., public key cryptography, or a variant of Needham-Shroeder)—so that all of the devices can produce an identical transformation (used for later matching the user's physical identity to their digital identity). The secure key sharing is constructed such that an external validation system (e.g., the cloud service) is unable to discover or recover the on-premises key.

In a further aspect, the first microprocessor is configured to maintain a rolling secret stored in a local data structure whose corresponding key is periodically provided to the external authentication server. By utilizing a rolling secret maintained locally, the threat of malicious access event emulation at the external authentication mechanism level can be reduced once the rolling secret has rolled over. The rolling secret, for example, can include a private symmetric key that is used to generate a message to the external authentication server with the key (e.g., generated based on a magic #, a sequence #, a facility #, a card #), etc. The external authentication server receives the transformed credentials (e.g., a securely-hashed value, generated from the underlying credentials), which it can process and something it is not capable of processing or generating (a token generated from the rolling secret).

In another aspect, the first microprocessor and the second microprocessor are configured for offline usage when disconnected from the external authentication server. The online usage capabilities can be limited. For example, the first microprocessor may be coupled to a data storage storing a cyclical buffer of previous successful access attempts and even if disconnected from the external authentication server, those authenticated profiles, upon the first microcontroller receiving a corresponding correct input from the ACM to the second microcontroller, can generate control signals provisioning or denying access to a controlled resource.

In another aspect, memory regions of data storage coupled to or residing on the first microprocessor can be used for avoiding the need for explicit time stamping through a re-use of the memory region marking mechanism. This mechanism is particularly useful where the clocks on the first or the second microprocessor (or both) cannot be relied upon to provide accurate timestamps (this issue arises in respect of low cost and low-power implementations, such as timestamp slippage or a poorly synchronized local clock), or if the microprocessors simply don't have clocks.

A compiler instruction can be used to mark memory as non-initialized—on initial power on, the system sets a flag to 0, once the system obtains network connectivity, it periodically updates a RAM based standard variable with the time. When the system restarts, the microprocessor takes that time and loads the time into the system clock. Accordingly, the microcontroller is able to maintain a view of current time across reboots or software failures without a battery, clock, etc.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
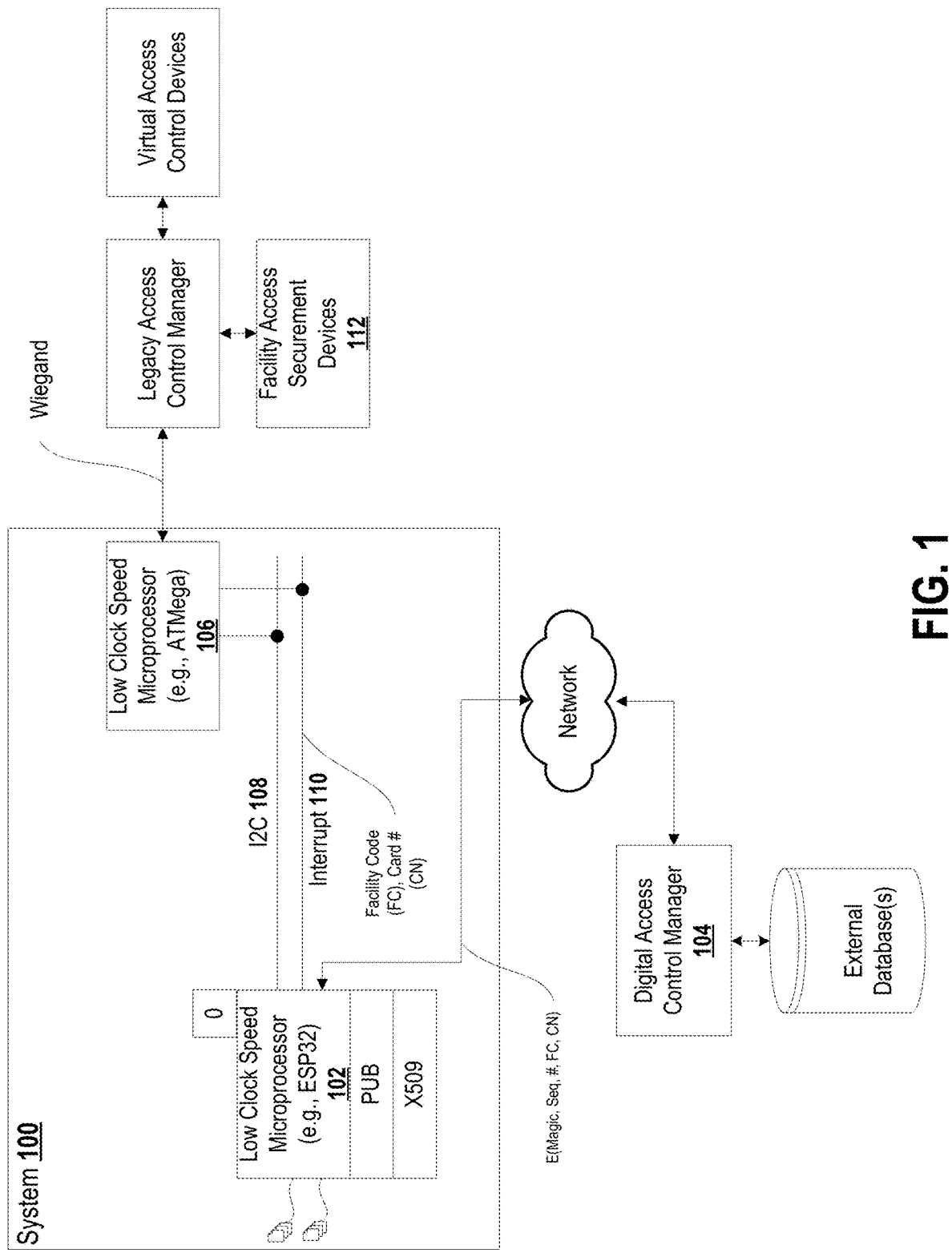
FIG. 1 is a block schematic diagram of an example system for access control, according to some embodiments.

Legacy approaches, whether wired or wireless, suffer from limitations that hamper adoption of traditional physical access-control technologies in modern, distributed corporate environments: (i) authentication of end-users must take place at fixed locations, limiting the ability to utilize traditional physical access-control technologies in mobile applications; (ii) those fixed locations must be in relatively close physical proximity to the other components of the enterprise's access control system, limiting the ability to utilize traditional physical access-control technologies in environments with widely-distributed assets; (iii) most existing signalling mechanisms utilized by access control systems (e.g., dedicated wiring or point-to-point wireless) cannot be monitored or protected with the infrastructure that enterprises typically use to monitor and protect their existing digital networks that connect their other data, digital-security and IoT networks; (iv) existing access control technologies typically require one-to-one connections between access control readers and access control panels, which means that increasing the number of secured assets/access-points typically involves the significant additional financial and labour cost of installing additional access control panels, etc.; and, (v) the one-to-one connections of existing access control technologies limit enterprises that manage multiple locations from maintaining consolidated views and monitoring of access control events.

A technical challenge that arises with using legacy communications protocols is that the speed at which the series of bits are signalled through modifications of electric current during the switches of magnetic states (or using RFID) requires high timing accuracy by a coupled microprocessor. For example, the width and timing of pulses can be critical. This level of timing accuracy can be important, for example, where the legacy communications protocols utilize coded signals such as specifically modulated radio waves (e.g., keyfobs operating at 315 MHz or approximately 433 MHz), modulated, for example, using amplitude-shift keying. In the context of RFID devices (access cards, car keyfobs, etc.), these devices simply blindly transmit signals without any flow control that would permit the receiver to delay or control the timing of the input from the RFID devices.

The primary problem is that legacy access control tokens transmit their payload asynchronously, typically via a one-way RFID protocol. This means that the transmitting RFID card, keyfob or similar device is unaware of the receiver's state, and, in particular, it is unaware of the receiver's immediate willingness or ability to receive the transmitted signal, and the receiver is unable to ask the transmitter to pause, repeat or change the speed of the transmission. If the receiver is not immediately able to receive every transmitted value, then one or more parts of the transmission will be lost and unrecoverable.

If any portions of the transmitted signal are lost, then the receiver will either be unable to interpret the transmitted credential, or it may incorrectly interpret the transmitted credential value as another, shorter value (e.g., if 6 bits are lost from a 32-bit credential transmission, it may be incorrectly received as a different, but valid-looking 26-bit credential transmission). These errors in reception can cause the legacy access control system to either deny entry to an otherwise-authorized individual, could incorrectly raise monitoring alarms related to invalid access attempts.

Additionally, in the case where a reception error causes the transmitted credential of Person A to be misinterpreted as a different credential value associated with Person B; in this case, it could inadvertently allow Person A to gain access to a facility with the credentials and access rights of Person B.

For low power microcontrollers (e.g., those designed to be operated using portable batteries or in regions where power is not steadily available), the controllers have slower clock speeds (e.g., 160 MHz or 16 MHz). Without being able to delay or control the timing of the input from the RFID devices, it is challenging to utilize slower clock speed microprocessors as a signal mistiming can render a device inoperable or cause poor operation as signals are not processed properly.

By utilizing network communication layers (e.g., Ethernet, IEEE 802.11 wireless, cellular data), a proposed microcontroller-based solution is described herein that allows existing physical access control systems and the associated access control readers (or access controllers, such as vehicular locks, garage door openers, cabinet latches) to be readily retrofitted to support mobile and/or geographically-dispersed environments with limited or without any additional changes to or reconfiguration of the existing system components. The approaches described herein are adapted to address technical problems associated with using electronic devices having limited computational functionality, such as limited power and/or clock speed.

Additionally, by utilizing network communication protocols (i.e., TCP/IP), this proposed microcontroller-based solution allows existing physical access control systems to be readily retrofitted to allow monitoring and protection through an enterprise's existing network monitoring systems, potentially without requiring any changes (e.g., significant changes) to the existing access control readers or systems. This allows an enhanced range of potential retrofits, including, for example, vehicle keyfobs, storage cabinet keypads, among others.

For example, a retrofit solution described herein provides a practical, low cost approach for addressing weaknesses with existing implementations (e.g., adding layers of security to overcome a vulnerability to a keyfob "relay attack") using low clock speed microprocessors. Similarly, extending functionality is also possible where, for example, one wishes to add mobile credential processing capabilities, well-ness checks, connections to actively managed directory service or digital security infrastructure, etc., to existing infrastructure without needing to re-wire existing readers.

Additionally, one remotely-situated microcontroller-based device, connected to an access control reader, may be configured to readily retrofit existing physical access control systems to permit mobile applications, without requiring any changes to the existing access control readers or systems; it can facilitate this by securely relaying an encrypted, time-limited representation of the end-user's authenticated access credential to a centrally-located microcontroller-based device that is connected to the enterprise's existing physical access control system, using standard network communication layer(s) and protocols. The microcontroller-based device can be electronically coupled to the access control reader, for example, as an additional component connected through wiring or wireless connectively that operates as an agent or intercepts signals to a backend access provisioning controller that ultimately grants or denies access by controlling the operation of a door or a latch.

In an embodiment, many remotely-situated microcontroller-based devices, connected to access control readers, are configured to relay end-users' authenticated access credentials to one centrally-located microcontroller-based device connected to a single traditional access control panel, thereby eliminating or reducing the traditional scaling costs associated with adding a large number of access points, without requiring any changes to the existing access control readers or systems.

A microcontroller-based device, connected to an access control reader, may be configured to relay end-users' authenticated access credentials to multiple microcontroller-based devices that are each connected to individual access control systems. This can permit access events at a plethora of locations to be mirrored and consolidated into one central location, without requiring any changes to the existing access control readers or systems, which provides for greatly-simplified, standardized monitoring of access events, reducing the cost and complexity of alternative approaches for retrofits. To address the signalling problem, wherein a multi-tasking receiver is required to be immediately ready to receive an incoming signal at any point in time, the proposed design of various embodiments uses one microcontroller that is always ready to process, decode and validate the incoming signals, and generate the timing-dependent outgoing signals, while the other microprocessor is able to handle the remaining work of communication with the remote digital server.

This eliminates the need to build the solution on larger, more-powerful CPUs that would otherwise need to be scaled for peek demand, which is a significant benefit in both the costs associated with higher-spec devices and the power requirements associated with higher-clockrate CPUs (as the power consumption requirements of a CPU scale approximately with the square of the clockspeed, which means that an implementation that requires 2 times the CPU speed will require 4 times the power in order to run the same application, which can significantly limit the application for solutions that are mobile or may not otherwise have access to continuous external power).

FIG. 1 is an example block schematic diagram of an example system for access control, according to some embodiments.

In FIG. 1, system 100 is shown as an on-premises device that is coupled to legacy access control mechanisms on one end and coupled to an external verification system. Coupling to legacy access control mechanisms is challenging with low-power or low-clock speed microprocessors as there is a high level of accuracy required for accurate communications.

System 100 can also be placed on remote locations, in other embodiments, such as being coupled to vehicular locks, garage door openers, cabinets/lockers, among others. The vehicular lock system may be expecting a coded series of pulses at a particular frequency from a keyfob to be received prior to unlocking a door or allowing ignition of an engine.

As the period of a clock cycle is the inverse of the clock speed, the clock cycles of the low power microcontrollers can be computationally long. While a high power processor can provide enough head room, the long clock cycles of the low power microcontrollers causes a technical problem in relation to achieving the high timing accuracy required by legacy communications protocols, especially where the low power microcontrollers are conducting other functions or the protocol requires narrow pulses (e.g., to provide voltage pulldowns to signal specific bits at approximately 50 µs—a single missed pulldown could result in an error).

In particular, when an error is encountered, the legacy system may simply not respond or throw an error signal, resulting in an individual either obtaining access when access is not warranted or not obtaining access although authenticated successfully.

A reason why low clock speed/low power microprocessors are desirable for these applications is that it is not always possible to incur the expense of higher power microprocessors, or that higher power microprocessors require increased power or cooling mechanisms.

For example, in certain situations, a low clock speed microprocessor is favourable as it is able to operate on portable energy sources (such as batteries) for extended periods of time (e.g., >5 days), which is a distinct advantage in locales where power is not readily or consistently available. In certain implementations, the facilities may simply not have power outlets near the access control devices and they must operate on portable energy sources. Low clock speed microprocessors also have a benefit of being compact in volume and weight, which allows for an increased ease of deployment.

When a low power microcontroller is tasked with multiple simultaneous operations requiring use of on-board computing resources, computational tasks may be delayed in execution, and these delays in execution (e.g., due to execution command congestion) can lead to deleterious effects in respect of generating electrical signals for communication with the legacy protocols or devices due to mistiming. When a signal is mistimed, it can be read incorrectly at the receiving device, and incorrect results may occur (e.g., denial of access to validated individual).

For example, a signal requiring 50+/−5 µs in accuracy could be delayed in transmission due to instruction congestion/backlog. For a legacy system where a delay in 50 µs leads to a completely different signal from being received, there may be a corresponding inaccuracy due to the delay at the receiver system.

As described in various embodiments herein, a microcontroller circuit 100 and corresponding circuit topologies, computing systems, methods of operation, and computer program products affixed in the form of non-transitory computer readable memories storing machine-interpretable instruction sets for execution on one or more computer processors is provided. The machine-interpretable instruction sets can be adapted as computer program products for execution on the one or more computer processors.

The circuit 100 is adapted to address four main signaling requirements: (i) it has to receive the incoming signal from a legacy access control token (for example, an RFID card, keyfob or similar device); (ii) it has to transform the signaled token value into a secure form, suitable for remote digital processing (e.g., via secure, one-way hashing, such as HMAC-SHA256) and then securely transmit that event information to the remote digital server (for example, via TLS-secured MQTT protocol); (iii) it has to receive back a secure authentication confirmation from the remote digital server, which must be decrypted, decoded and processed (for example, via TLS-secured MQTT protocol); and, (iv) it must then recreate and transmit the original legacy access control token onwards to the legacy access control system, using the precise format and signal timing that the legacy access control system is configured to accept.

A proposed device (e.g., a microcontroller circuit) 100, in accordance with a first aspect, includes a first microprocessor 102 configured for interfacing with a digital access control backend 104, and a second microprocessor 106 configured for dedicated communications with an access control manager device backend.

The first microprocessor 102 (e.g., an ESP32 system on a chip microprocessor) is a master device that controls the operation of the second microprocessor 106 (e.g., an ATMega168 microcontroller having general purpose input/output pins) as a secondary device.

In particular, the first microprocessor 102 is adapted for conducting digital communications protocols and credential transformation operations. The second microprocessor 106 emulates signals based on command instructions received from the first microprocessor 102, the emulated signals used for communicating with a legacy ACM system. The first microprocessor 102, in some embodiments, has greater computing capability than the second microprocessor 106. In another embodiment, both the first microprocessor 102 and the second microprocessor 106 can have the same or similar computing specifications. Because the second microprocessor 106 is dedicated to communications across the signalling protocol, its ability to provide correctly timed signals is improved.

A microcontroller system 100 incorporating the first microprocessor 102 and the second microprocessor 106 provides an interface between access events (e.g., physical or virtual access events) that operate on legacy systems and coupling them to digital backend that provides enhanced user profile/security features.

The legacy transaction protocol is translated for two-way communication—in one direction for transmitting access tokens provided by users (e.g., door badging at a panel using a key fob) and in the other direction for provisioning access (e.g., granting access by releasing a magnetic lock or initiating a secured computer session on a secured graphical user interface). The legacy transaction protocol can, in some embodiments, be based on analog signals that are shaped to reflect a digital signal being communicated. For example, the analog signals may be reproduced with digital bits signalled through corresponding voltage pulldowns which signal digital bits (e.g., 0 or 1).

The legacy transaction protocol may interact with specific protocols such that a reader will be able to read from the analog signal characteristics the digital signal. The digital signal can, in some embodiments, be a representation of a characteristics of the badge access event device or the person associated with the access badge, such as age, sex, title, facility code, client code, among others.

The system may reside on-premises such that data transferred (e.g., facility numbers, card numbers) can be locally stored.

The first microprocessor 102 and the second microprocessor 106 are electronically coupled to one another through a messaging bus 108, and in some embodiments, an additional interrupt line 110 that operates to enable the second microprocessor 106 to communicate event triggers to the first microprocessor 102 (e.g., instead of inefficiently polling). The message bus 108 can be, for example, based on a I2C architecture.

The interrupt line 110 can be a signal path that is designed for level triggering or edge triggering, and for example, can be a signal path having a voltage that is pulled down or up whenever an interrupt signal is being established. The interrupt signal, in this example, can indicate to the master first microprocessor 102 that an authentication attempt is underway at the device coupled to second microprocessor 106, rather than having the first microprocessor 102 continually poll the second microprocessor 106 to query whether such signal is present.

An example physical access controlled by second microprocessor 106 could be used for controlling/denying entry into a building when a key card is presented at a reader. When the key card (or other key token, such as a key fob) or other credentials are presented at the reader, an authentication challenge response signal can be transmitted. The authentication challenge response signal can be as simple as a card ID #associated with the key card, or more complex signals such as rolling codes that are generated based on a shared secret between the key token and the reader (e.g., a rolling code approach).

In legacy systems, the reader may be configured to receive a Wiegand signal from the key card (e.g., as a magnetic strip is run across or an RFID card is presented, a series of electrical pulses are generated) and this signal is sent to the secondary microprocessor (second microprocessor 106) to decode and then the decoded message is sent to the master microprocessor (first microprocessor 102), which either authenticates locally (in some embodiments) or authenticates by sending a transformed decoded message to an external authentication mechanism 112 (e.g., an external server).

The external authentication mechanism 112 can include a cloud-based server implementation which is coupled to a user profile matching engine. The cloud-based server implementation can incorporate processing rules which are adapted to generating digital rules-based architecture for determining access provisioning decisions.

Accordingly, complex decision making can be established despite the presence of legacy systems, and in accordance with various embodiments herein. Complex decision making can include time-based rules, machine learning based determinations, combinations with step up authentication (e.g., usage of combinations with other modalities where there is a potential for false positives or inconclusive authentication).

For example, a user who should otherwise be authenticated for access at 8 AM attempts access at 2 AM. The system may detect a correct authentication and key token presented at the reader, but for this user profile, the external authentication mechanism 112 may control an additional authentication to occur to request a fingerprint to add to an overall holistic determination of authentication.

Upon receipt of a successful authentication message from the external authentication mechanism 112, the master microprocessor (first microprocessor 102) sends an instruction signal to the secondary microprocessor (second microprocessor 106) to generate a corresponding signal for controlling the access control provisioning (e.g., in a legacy communication protocol).

By transforming the message such that only a securely hashed version is sent to the external authentication mechanism 112, the underlying decoded message is not revealed to the external authentication mechanism 112. For example, the information is securely hashed based on a key that is only stored on-premises and thus never transferred to the external authentication mechanism 112. An example virtual access could include controlling/denying secured login into a restaurant cashier terminal when a server presents a key card at a reader coupled to the cashier terminal.

The key card could provide an initial facility code and a card ID, and this information may be received by the second microprocessor 106, decoded, and passed to first microprocessor 102. The first microprocessor 102 then securely hashes and transforms the data, and only the transformed data is sent to the external authentication mechanism 112.

The first microprocessor 102 can store local secret keys on-premises, which can be used in conjunction with public keys to be signed and for generation of certificates (e.g., x509 certificates). Accordingly, a hard segregation can be established between the microcontroller system and the external systems.

In another aspect, an additional interrupt connection link is established between the first microprocessor 102 and the second microprocessor 106 to allow for interrupt type signals to be transmitted (e.g., to reduce a need to utilize polling, which could be computationally costly and inefficient to operate).

This interrupt connection link is a technical improvement that is adapted for communication for controlling the second microprocessor 106. Other bus protocols (for example, I2C) have a technical deficiency as the protocol is not adapted to allow a secondary device (e.g., a "slave") device (such as a microcontroller receiving Wiegand signals) to initiate communication with the primary "master" device (e.g., the primary microcontroller).

This means that the second microprocessor 106 would normally have no way of announcing that a new scan (e.g., card scan) has occurred. Using a naïve implementation of I2C, the first microcontroller 102 would need to continuously poll the second microprocessor 106 to determine if anything has arrived. This approach would introduce two technical problems: (i) it delays the real-time processing of the user's card scan; and, (ii) the polling requests from the "master" all add additional overhead to the second microcontroller 106, which increases the likelihood of missing incoming signal bits (e.g., Wiegand bits), causing a miscommunication error.

In another aspect, the first microprocessor 102 is coupled to an external authentication mechanism 112 (e.g., external authentication server) and configured to transform received credentials from the second microprocessor 106. Local credentials (e.g., facility number, card ID number) are transformed (e.g., through the use of public key encryption or secure hashing) prior to communication to the external authentication mechanism 112.

In particular, the transformation of the local credentials allows the ability to avoidance of sending up plaintext/reversible local credentials to the external authentication mechanism 112. By sending only transformed credentials, the external authentication mechanism 112 is able to authenticate the associated user profiles without having the ability to observe directly the schema or underlying local access credentials.

In a further aspect, the first microprocessor 102 is configured to maintain a rolling secret stored in a local data structure whose corresponding key is periodically provided to the external authentication server. By utilizing a rolling secret maintained locally and periodically transmitted, the threat of malicious access event emulation at the external authentication mechanism 112 level can be reduced once the rolling secret has rolled over.

The rolling secret, for example, can include a private symmetric key that is used to generate a message to the external authentication server with the key (e.g., generated based on a magic #, a sequence #, a facility #, a card #), etc. The external authentication server receives the transformed credentials (e.g., a cookie generated from the underlying credentials), which it can process and something it is not capable of processing or generating (a token generated from the rolling secret).

In another aspect, the first microprocessor 102 and the second microprocessor 106 are configured for offline usage when disconnected from the external authentication server.

The online usage capabilities can be limited. For example, the first microprocessor 102 may be coupled to a data storage storing a cyclical buffer of previous successful access attempts and even if disconnected from the external authentication server, those authenticated profiles, upon the first microcontroller receiving a corresponding correct input from the ACM to the second microcontroller, can generate control signals provisioning or denying access to a controlled resource.

In another aspect, memory regions of data storage coupled to or residing on the first microprocessor 102 can be used for avoiding the need for explicit time stamping through a re-use of the memory region marking mechanism. This mechanism is particularly useful where the clocks on the first or the second microprocessor 106 (or both) cannot be relied upon to provide accurate timestamps (this issue arises in respect of low cost and low-power implementations, such as timestamp slippage or a poorly synchronized local clock), or if the microprocessors simply don't have clocks.

A security log may also persist across reboots, without requiring the use of flash memory. Flash memory is typically the only storage medium available on these low-power devices (i.e., they don't have hard drives) and flash memory will burn out and become unusable after anywhere from 250k to 1M write-cycles which makes it infeasible for maintaining constantly-changing logs.

The "typical" approach is to use a large amount of flash memory and use "wear-levelling" techniques to try to maximize the lifetime of the flash chips. The approach described herein maintains the required data structures needed for secure operation—without the need for operations that ultimately degrade the on-device flash memory.

A compiler instruction can be used to mark memory as non-initialized—on initial power on, the system sets a flag to 0, once the system obtains network connectivity, it periodically updates a RAM based standard variable with the time. When the system restarts, the microprocessor takes that time and loads the time into the system clock. Accordingly, the microcontroller is able to maintain a view of current time without a battery, clock, etc.

In some embodiments, it is critical to maintain logs of access events, for audit and security purposes. This requires accurate timestamps to be maintained for any access events or exceptions—especially during events where someone may be attempting to tamper with the system by interrupting network connectivity, or where mobile implementations might not have network connectivity (e.g., in a parking garage or remote location).

A naive approach would be to put a clock and a battery into the device—but that requires periodic maintenance of the battery (or limits the service lifetime of the device).

Figure 2:
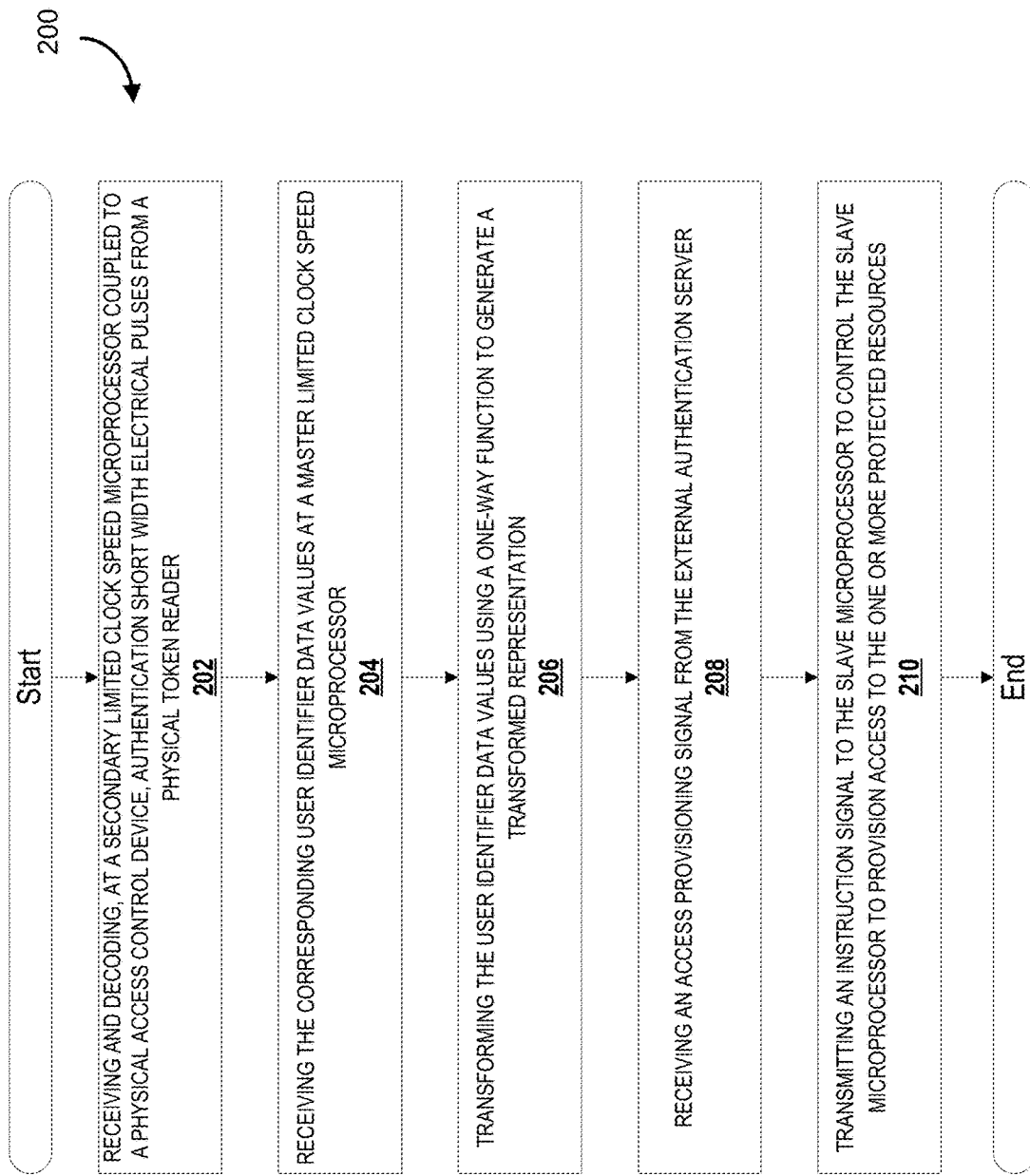
FIG. 2 is an example method diagram showing an example method for access control, according to some embodiments.

FIG. 2 is an example method diagram showing an example method 200 for access control, according to some embodiments, showing example steps 202-210, which are non-limiting and other, different, alternate steps are possible. At 202, a token or signals from a token are presented at a legacy reader, and the secondary (e.g., slave) limited clock speed microprocessor receives the signals and decodes the signals. The signals, for example, can include authentication short width electrical pulses from that are received at a physical token reader. These signals are intercepted at the point of presentation and processed by the secondary limited clock speed microprocessor.

At 204, this decoded message is then provided in the form of a decoded identifier data value to the primary limited clock speed microprocessor. The primary limited clock speed microprocessor can interact with an external authentication server by first converting the decoded message into a hashed representation and submitting the hashed representation to the external authentication server. By generating the hashed representation, the actual identifier associated with the user's identifier token need not be transmitted openly to the external authentication server, removing a source of cybersecurity risk.

At 206, the external authentication server processes the hashed representation to make an access provisioning determination. In some embodiments, this can include extended functionality prior to making the determination, such as controlling a mobile device to conduct other assessments in respect of location of the mobile device, requiring the entering of a password, among others. In another embodiment, the external authentication server compares the user identifier against an access control list, such as an active directory and various logical conditions thereof. For example, the external authentication server may require that a waiver has been filed on record, or a wellness declaration and temperature score below a particular threshold having been saved on record. At 208, the access provisioning signal 208 is received by the primary limited clock speed microprocessor, which at 210, controls the secondary limited clock speed microprocessor to conduct an actuation to allow access to various protected resources. In some embodiments, instead of controlling the secondary limited clock speed microprocessor, the primary limited clock speed microprocessor itself conduct an actuation to allow access to various protected resources. Providing access can include unlocking a door, unlocking electronic access to an electronic account, unlatching a cabinet door, open a garage door, unlocking a vehicle's ignition, etc.

Figure 3:
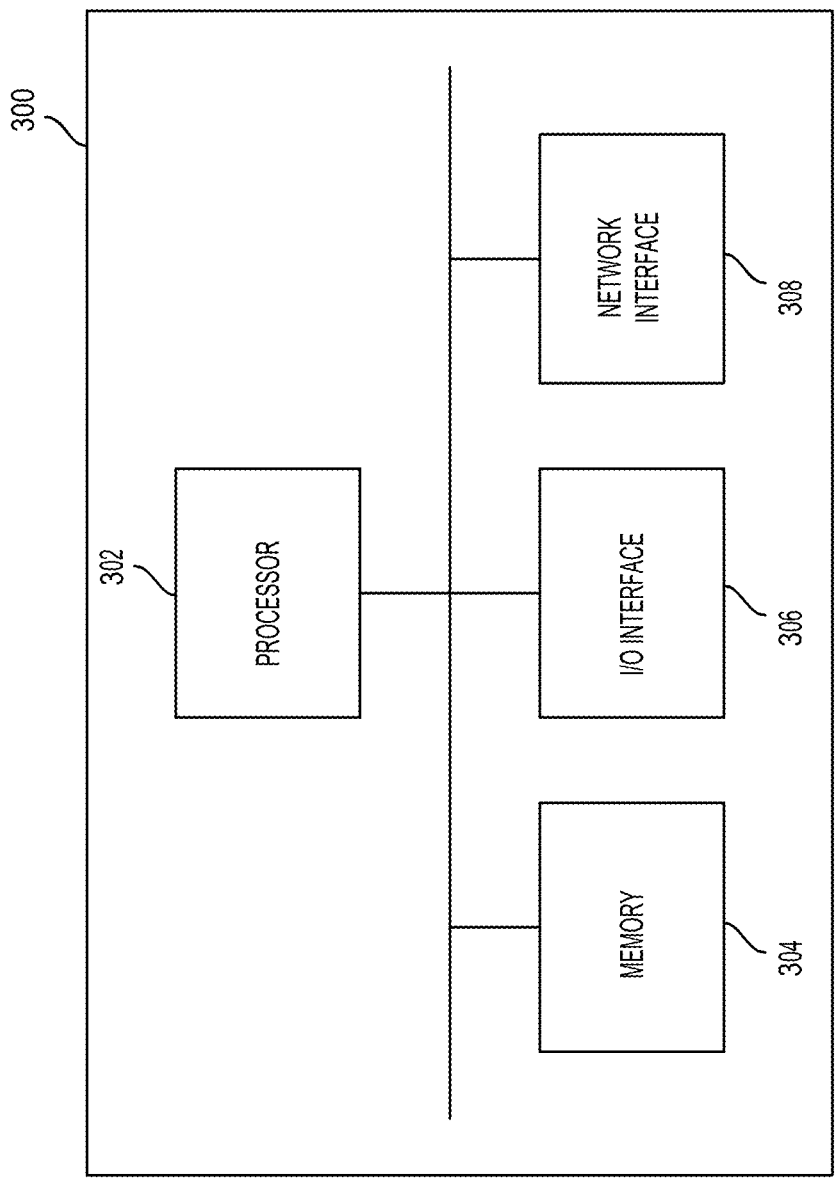
FIG. 3 is an example computing device, according to some embodiments.

FIG. 3 is an example computing device 300, according to some embodiments. The computing device 300 is an example microprocessor or microcontroller, and the device 300 can include a computer processor 302, memory 304 (e.g., read only memory, random access memory), an input/output interface 306 (e.g., I/O pins), and an interface 308 for communication, for example, with a message bus. The computer processor 302 can be configured to interpret machine-interpretable instructions stored on a non-transitory computer readable medium, and to execute a method for access control in accordance with methods described in embodiments herein.

Figure 4:
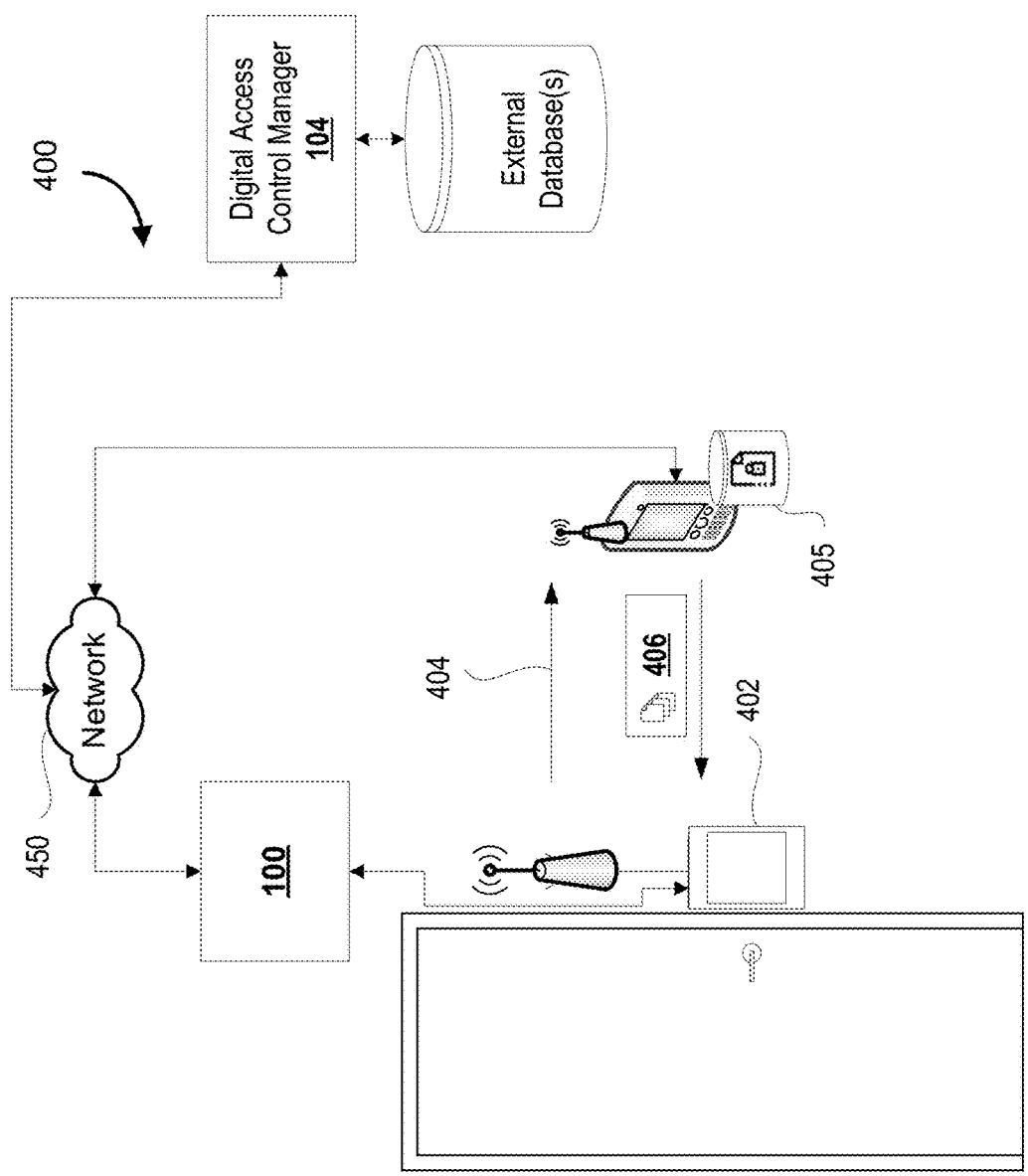
FIG. 4 is a diagram showing an example retrofit system, according to some embodiments.

FIG. 4 is a diagram showing an example retrofit system, according to some embodiments. In diagram 400, an existing card reader 402, is augmented by a backend control unit 408 that can, for example, be a system 100 that operates to intercept signals as described in various embodiments herein. The system 100 includes at least two low clock speed microprocessors that operate with one another to coordinate messaging using legacy protocols where one of the low clock speed microprocessors is dedicated to signal emulation in respect of received signals and/or access control provisioning signals. Accordingly, a person may present his/her key card to the reader 402.

A signal may be provided, for example, through electrical coupling of the key card to the reader 402 (e.g., a series of electrical pulses). The signal may be intercepted by the system 100 and read by a secondary, dedicated low clock speed microprocessor for generating an identity data object from the information adduced (e.g., converting the series of electrical pulses into an identity value). This data object is then provided to a primary low clock speed microprocessor that generates a representation of this data object (e.g., a one way hashed version of the identity value) for transmission across network 450 to a backend digital access control manager 104 that can be coupled to one or more external databases.

For example, backend digital access control manager 104 can include digital access controls that utilize an active directory service for improved control and authentication of the user. In this example, backend digital access control manager 104 can interoperate with a mobile device having a secure repository for credential storage 405 and require an increased mobile credential 406 to be asserted in certain situations when the key card is presented to the reader 402. For example, this can be required at a first usage of the key card, or when a security level has been increased (e.g., a pattern of breaches have been noticed in the news). The mobile credential 406 can include various tokens or data objects, such as data packets having biometric information, password information, etc. In some embodiments, mobile credential 406 is related to requirements relating to wellness checks or other physical characteristics, such as requiring a declaration in respect of recent travel, recent location information from the device (e.g., to indicate that no recent travel has occurred), temperature readings (e.g., from a coupled biometric device), among others.

Upon authentication, the backend digital access control manager 104 can provide a corresponding authenticated data object to the primary low clock speed microprocessor, which can then decode and securely transmit an instruction command to the secondary low clock speed microprocessor. In some embodiments, the secondary low clock speed microprocessor can emulate an authenticated signal based on a series of emulated codes and pulses to interoperate with the legacy system to provide access to the secured resource (e.g., unlocking door latch or magnetic closure device).

In some embodiments, the device of FIG. 4, instead of being a retrofit, can include an extension of a legacy system. In this example, a card reader 402 can be installed at a remote site, such as an inventory shed, that can be difficult or impractical to connect via wiring. The system 100 can emulate the signals to a wired panel coupled to the legacy system to enable interoperability.

FIG. 4 is a simplified example; in some embodiments, the card reader 402 is coupled to a plurality of access controllers (e.g., doors, lockers) in the legacy implementation. The signalling challenge here is exacerbated as the card reader 402 can receive multiple signals from access attempts at the plurality of doors and signal timing becomes even more important. In such a situation, an implementation with a single lock clock speed microprocessor may become overwhelmed by multiple tasks and may miss actuations (or even worse, misinterpret actuations and inadvertently allow access). A reader 402 to many secured access element (i.e., 1:n) situation can occur, for example, where the secured resource is an evidence locker having many doors (e.g., evidence from crime scene A, B, C each having their own section). Other situations are also possible, such as three readers 402 servicing fifteen secured resources.

Figure 5:
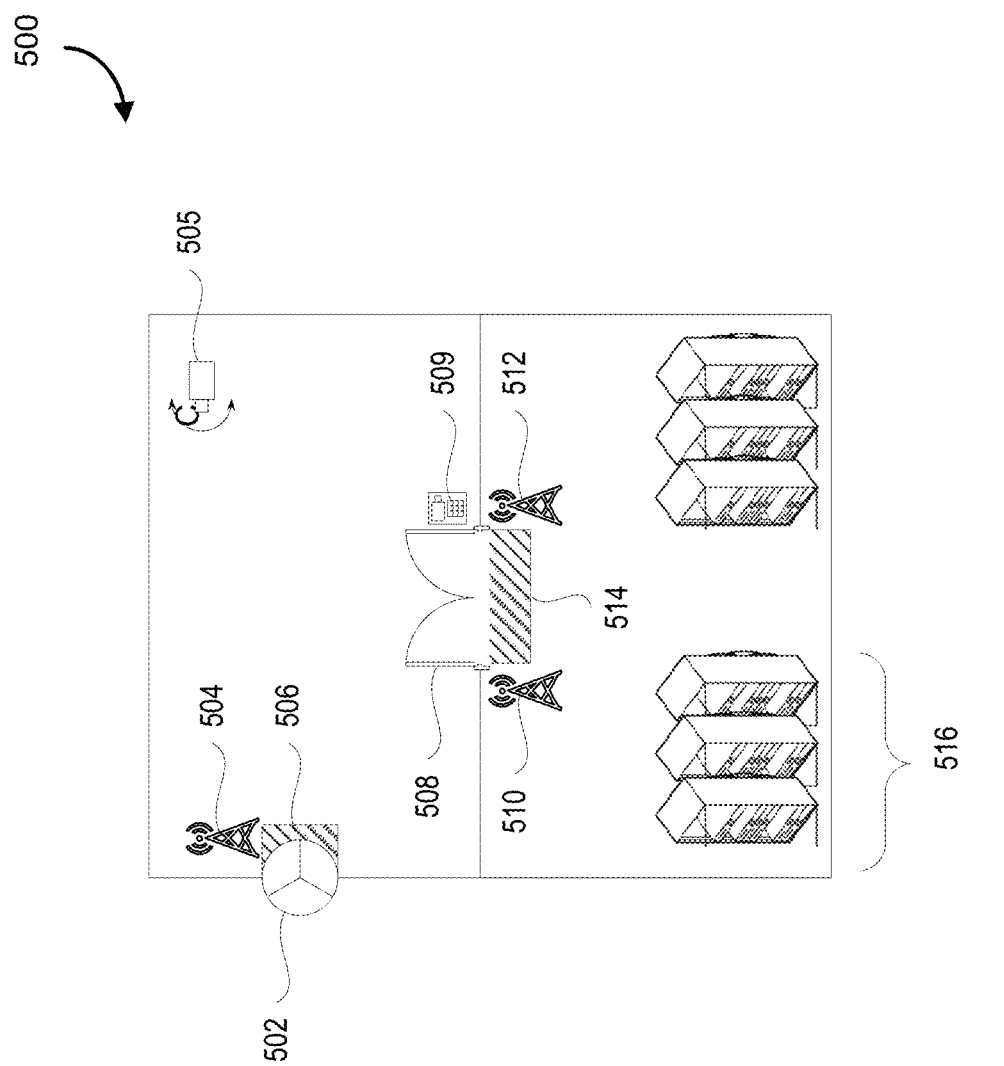
FIG. 5 is an example block schematic showing a more complex system, according to some embodiments.

FIG. 5 is an example block schematic showing a more complex system, according to some embodiments. In this example, diagram 500 shows a facility having a legacy system device 502, 509 that is extended with additional beaconing devices 504, 510, 512. These beacon devices 504, 510, 512 are utilized in conjunction, for example, with a security camera or motion sensor 505 and a mobile device to ensure that a coupled mobile device is in a physical vicinity of the legacy system device 502, 509 in addition to simply providing a key card. This is useful where a stolen key card is being utilized. By requiring the mobile device is in a physical vicinity of the legacy system device, the stolen key card is more difficult to use without the rightful owner being present. The legacy system devices 502, 509 can be extended with a system 100 as described in various embodiments. In an example, the legacy system devices 502, 509 can both be serviced by a single backend reader 402 that is coupled to both and receives/processes signals from both, sending actuation signals directly to the corresponding access provisioning mechanism (e.g., mantrap revolving door, door latch).

The primary microprocessor can interoperate with the beacon devices and/or a digital backend, and control the secondary microprocessor for interoperation with the legacy system device 502, 509 (e.g., signal interception and emulation both at the credential interaction level and the access granting level, respectively). A series of pulses can be intercepted, processed with an additional level of scrutiny, and upon successful authentication at the higher level of scrutiny, a successful validation can be emulated and utilized for granting access to the secured resource 514 (in an example, a server room). The beacon signals, for example, when received by the mobile device can be converted into distance estimations (e.g., −25 dB, −26 dB) so that the person has an additional level of validation by having the mobile device relay rolling codes along with the distance estimations as part of the validation process.

A variation can include utilizing the system to be extended to garage doors, remote gates, among others. Supporting remote locations require the devices to manage a secure, encrypted network communication (to maintain a link to the centralized access control system). This raises similar technical issues as noted in various sections herein: the overhead of managing those interactions can interfere with the hard real-time requirements involved with capturing the incoming signals from access control tokens.

As a further example, this proposed solution would allow a large number of new access-controlled spaces to be added to an existing access control system, without requiring the corresponding costs that would be traditionally associated with expanding the central access control system. In this implementation a large number of access-controlled cabinets, such as a set of evidence lockers 516, could be connected to one or more microcontroller-based devices.

Each of the evidence lockers 516 can be coupled to a legacy reader, and an additional extension may include, for example, access control devices that could be connected to a traditional access control reader to receive user credentials, and a traditional PIN pad to allow the user to enter the locker number.

Once the end-user's credential is authenticated, the microcontroller-based device would close an attached electrical relay, thereby unlocking the selected locker 516. This permits a plethora of spaces to be securely controlled by a central access control system, without requiring any changes to the existing access control readers or system, and without the costs of scaling the central access control system.

Figure 6:
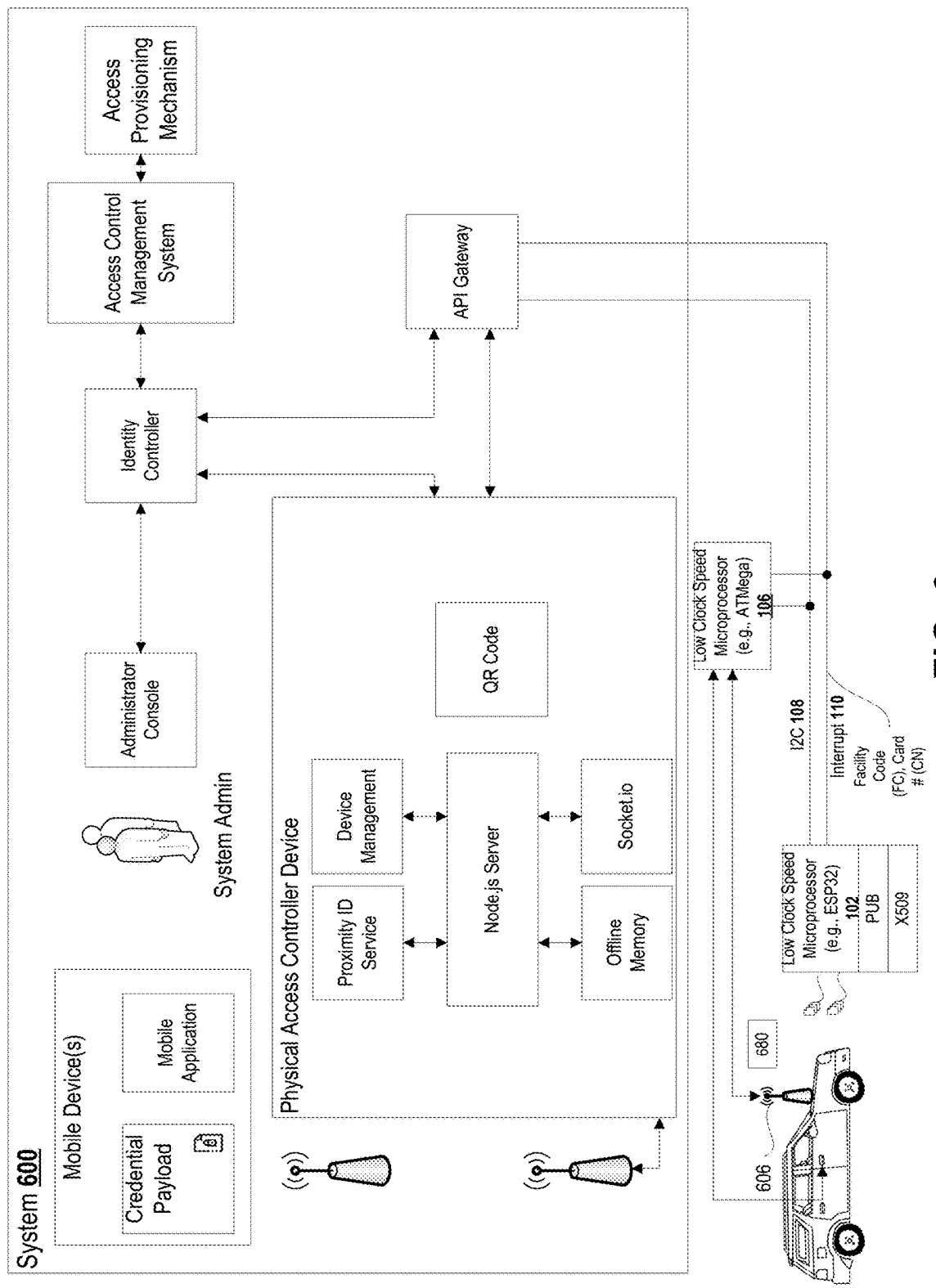
FIG. 6 is a block schematic showing a system being extended to provide protection in respect of a vehicle, according to some embodiments.

FIG. 6 is a block schematic showing a system being extended to provide protection in respect of a vehicle, according to some embodiments. System 600 in this example is a premises-based security system that is extended to provide improved authentication and validation in respect of a vehicle. In this example, a keyfob 680 can be presented to a legacy validation/lock device 606. The legacy validation/lock device 606, in a naïve implementation, is vulnerable to a relay attack where the keyfob 680's signal is instead of being proximate, is relayed by a pair of malicious users operating in tandem.

The digital system 600 can be utilized along with components of the device described in system 100 to provide an efficient and effective retrofit solution to intercept and emulate signals to provide additional layers of security or validation prior to unlocking a door or ignition. As noted herein, additional layers of validation can include declarations or indications in respect of rest (e.g., for truck drivers, a data object representing their sleeping/movement patterns), or in respect of drug testing (e.g., intoxication).

In this implementation, a microcontroller-based device mounted inside the vehicle would be attached to a traditional access control reader for receiving end-user credentials, and a modem (e.g., cellular) for network connectivity back to the access control system. Once the end-user's credential is authenticated, the microcontroller-based device would close an attached electrical relay, thereby enabling the vehicle's existing ignition system.

Additionally, the microcontroller-based device can retain a local cache of the end-user credential inside a local cache, to permit subsequent re-authentication of the user, even if the vehicle is outside of cellular range (e.g., in an underground parking garage). This permits access to a remote, mobile vehicle to be securely controlled by a central access control system, without requiring any changes to the existing access control readers or system.

As a further example, this proposed solution would allow an existing access control system to be extended to remote locations that cannot be served by traditional, centralized wired/wireless solutions. In this implementation, a microcontroller-based device mounted at a remote location would be attached to a traditional access control reader for receiving end-user credentials, and a modem (e.g., cellular) for network connectivity back to the access control system.

Once the end-user's credential is authenticated, the microcontroller-based device would close an attached electrical relay, thereby unlocking the door (e.g., releasing a maglock, an electrically-controlled door strike, or an electrically-controlled mortise lockset). This permits the remote location to be securely controlled by a central access control system, without requiring any changes to the existing access control readers or system.

The system 100 provides a low cost system that can be used for a wide retrofit, and accordingly, an existing access control system to be extended into automotive vehicles, to permit those systems to control the remote access to vehicle fleets, in order to ensure that drivers are authorized employees and/or have proper training (e.g., hazardous vehicle operators).

Figure 7:
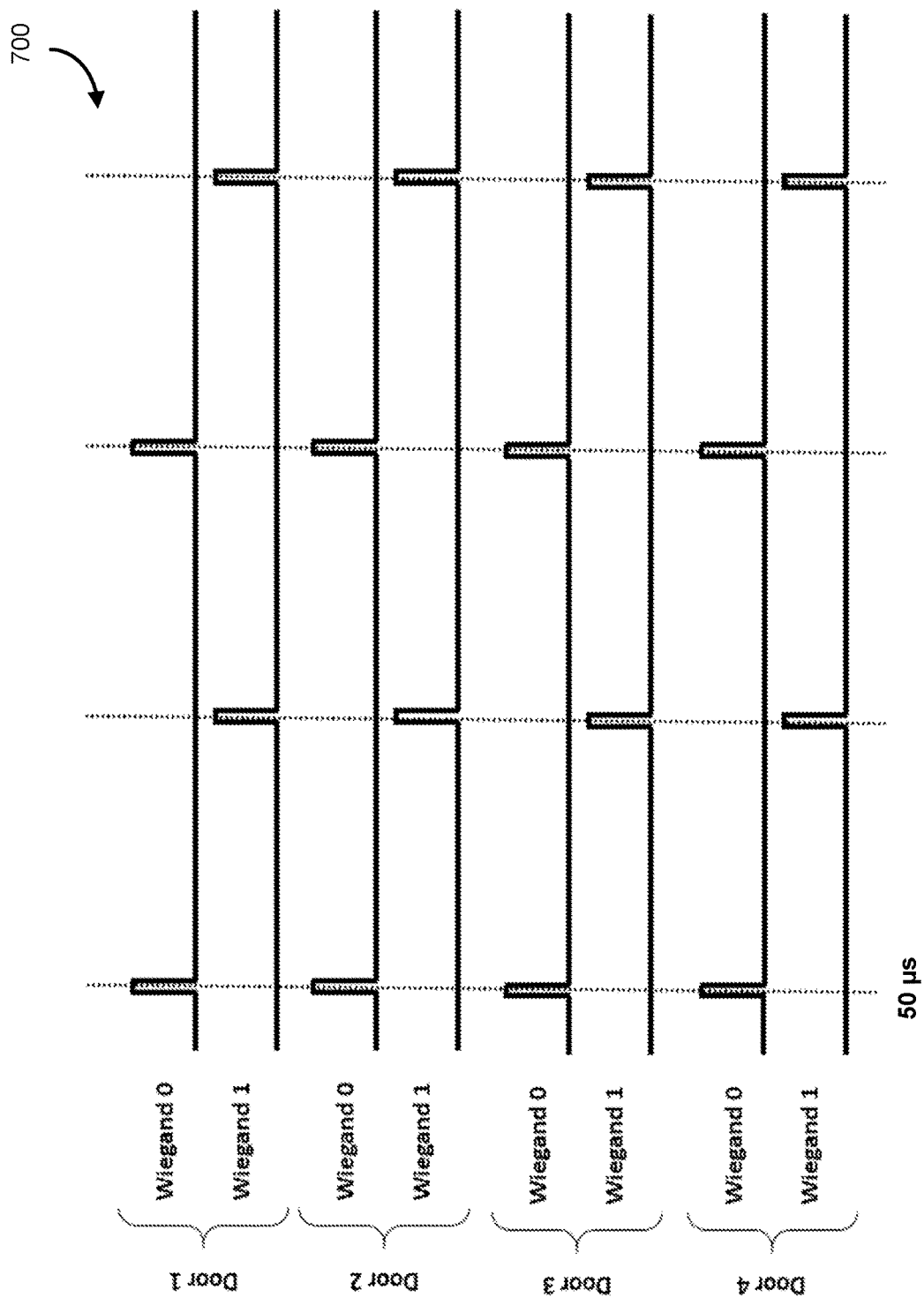
FIG. 7 is a electrical pulse diagram of signals associated with a set of example doors, according to some embodiments.

FIG. 7 is a electrical pulse diagram of signals associated with a set of example doors, according to some embodiments. In diagram 700, a set of four doors are shown, with pulses associated with Wiegand 0 and 1 actuations.

Legacy access control systems make use of door controllers that typically service many readers, which means that interface devices such as this must have the capability of receiving multiple, simultaneous signals, as shown in FIG. 7.

Figure 8:
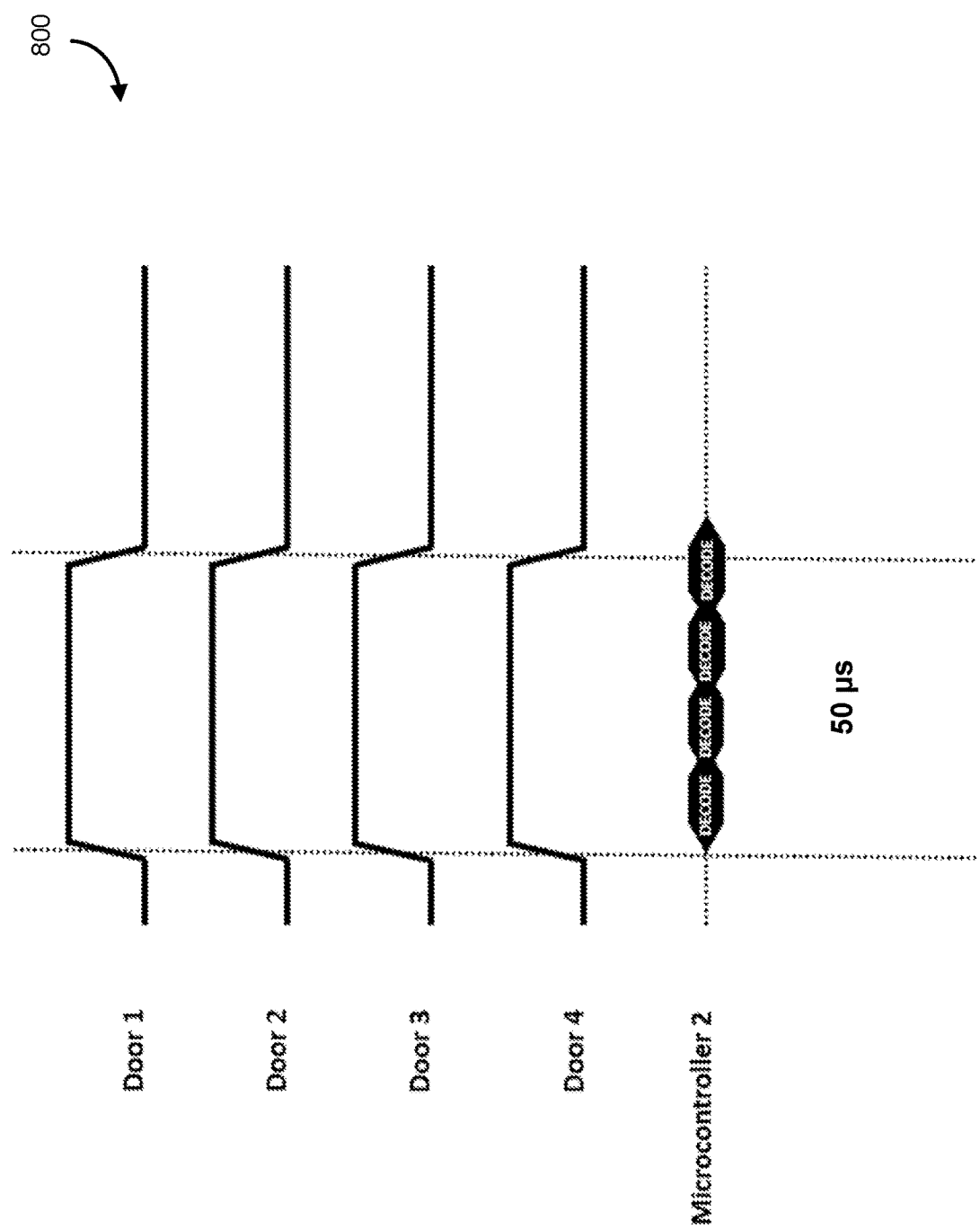
FIG. 8 is a second electrical pulse diagram of signals associated with a set of example doors, according to some embodiments.

FIG. 8 is a second electrical pulse diagram of signals associated with a set of example doors, according to some embodiments. In this example diagram 800, a microcontroller is shown to be tasked with various decoding tasks in a short 50 μs window.

With typical clock speeds and door configurations, this means that a low-power microprocessor would be required to respond to any incoming bits within a small number of clock cycles, as shown in FIG. 8; during this time the microcontroller must detect a level-change on the Wiegand input, process a software interrupt, sample its ADC to determine the level of the line ("0" or "1"), store the result in an internal data structure, reset the software interrupt settings, and return from the interrupt handler.

As noted in this diagram 700, the pulses have very short durations of time in which they can be processed, and a missed duration or a mis-timed actuation could lead to a miscommunicated or uninterpretable signal.

It is important to note that not all embodiments are limited to Wiegand, and other protocols that have similar timing accuracy considerations are also contemplated. Incoming pulses can be read by the secondary microprocessor for decoding a message provided by a keyfob and intercepted. The secondary microprocessor can, upon a successful authentication, be controlled to emulate the access pulses to the legacy system, for example, controlling electronic circuits to generate a corresponding set of pulses as if the system was encountering the keyfob.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A device for controlling access to one or more protected resources, the device comprising:

a secondary limited clock speed microprocessor coupled to a physical access control device, the secondary limited clock speed microprocessor configured to:

receive and decode authentication electrical pulses from a physical token reader as when a physical token interacts with the physical token reader to generate corresponding user identifier data values, and the secondary limited clock speed microprocessor configured to: transmit electrical pulse signals to an access control management device that provisions access to the one or more protected resources;

a master limited clock speed microprocessor coupled to an external authentication server and the secondary limited clock speed microprocessor, the master limited clock speed microprocessor configured to:

receive the corresponding user identifier data values, transform the user identifier data values using a one-way function to generate a transformed representation for communication to the transformed representation to the external authentication server, receive an access provisioning signal from the external authentication server, and transmit an instruction signal to the secondary limited clock speed microprocessor to control the secondary limited clock speed microprocessor to provision access to the one or more protected resources, wherein the secondary limited clock speed microprocessor and the master limited clock speed microprocessor are coupled to one another across a message bus connection and a separate interrupt connection, the interrupt connection enabling uni-directional communication from the secondary limited clock speed microprocessor to the master limited clock speed microprocessor to indicate when the physical token interacts with the physical token reader, and wherein the secondary limited clock speed microprocessor is dedicated to emulate received signals from said physical token reader, and to decode said access control provisioning signal received from said master limited clock speed microprocessor and transmit said decoded access control provision signal to said access control management device in a format and timing that is compatible with said access control management device.

2. The device of claim 1, wherein the master limited clock speed microprocessor is associated with a secure, pre-shared key and that key is used to transform the user identifier data values via a secure, one-way hashing function.

3. The device of claim 2, wherein a private key is periodically regenerated locally and is locally stored on data storage of a first microprocessor and used to generate a rolling secret data structure sent in conjunction with the transformed representation to the external authentication server such that a duration in which a responsive access provisioning signal from the external authentication server is valid for processing by the first microprocessor is limited based at least on a rolling duration of the periodically generated rolling secret data structure.

4. The device of claim 1, wherein the master limited clock speed microprocessor maintains a cyclical buffer storing information from one or more prior successful access attempts that is used for authentication when the external authentication server is not accessible.

5. The device of claim 1, wherein a memory region marking mechanism is utilized to store a representation of time in a memory region of a data storage of a first microprocessor, the memory region marking mechanism marking a non-initialized data storage location.

6. The device of claim 1, wherein the one or more protected resources include at least one physical access entryway.

7. The device of claim 1, wherein the one or more protected resources include at least one virtual protected resource, the at least one virtual protected resource provisioned for access by initiating an authorized computing session on a graphical user interface of a computing device.

8. The device of claim 1, wherein the secondary limited clock speed microprocessor and the master limited clock speed microprocessor each have clock speeds under 250 MHz.

9. The device of claim 1, wherein the user identifier data values include at least a facility code value and a card code value.

10. The device of claim 1, wherein said physical token is associated with an entity, and wherein receiving said access provisioning signal from said external authentication server is based on whether a mobile communication device associated with said entity is within a threshold distance of said physical token reader when said physical token interacts with said physical token reader.

11. A method for controlling access to one or more protected resources, the method comprising:
receiving and decoding, at a secondary limited clock speed microprocessor coupled to a physical access control device, authentication electrical pulses from a physical token reader generated when a physical token interacts with the physical token reader to generate corresponding user identifier data values, the secondary limited clock speed microprocessor configured for transmitting electrical pulse signals to an access control management method that provisions access to the one or more protected resources;
receiving the corresponding user identifier data values at a master limited clock speed microprocessor coupled to an external authentication server and the secondary limited clock speed microprocessor,
transforming the user identifier data values using a one-way function to generate a transformed representation for communication to the transformed representation to the external authentication server,
receiving an access provisioning signal from the external authentication server, and
transmitting an instruction signal to the secondary limited clock speed microprocessor to control the secondary limited clock speed microprocessor to provision access to the one or more protected resources,
wherein the secondary limited clock speed microprocessor and the master limited clock speed microprocessor are coupled to one another across a message bus connection and a separate interrupt connection, the interrupt connection enabling uni-directional communication from the secondary limited clock speed microprocessor to the master limited clock speed microprocessor for indicating when the physical token interacts with the physical token reader, and
wherein the secondary limited clock speed microprocessor is dedicated to emulating received signals from said physical token reader, and to decoding said access control provisioning signal received from said master limited clock speed microprocessor and transmitting said decoded access control provision signal to said access control management device in a format and timing that is compatible with said access control management device.

12. The method of claim 11, wherein the master limited clock speed microprocessor is associated with a secure, pre-shared key and that key is used to transform the user identifier data values via a secure, one-way hashing function.

13. The method of claim 12, wherein a private key is periodically regenerated locally and is locally stored on data storage of a first microprocessor and used to generate a rolling secret data structure sent in conjunction with the transformed representation to the external authentication server such that a duration in which a responsive access provisioning signal from the external authentication server is valid for processing by the first microprocessor is limited based at least on a rolling duration of the periodically generated rolling secret data structure.

14. The method of claim 11, wherein the master limited clock speed microprocessor maintains a cyclical buffer storing information from one or more prior successful access attempts that is used for authentication when the external authentication server is not accessible.

15. The method of claim 11, wherein a memory region marking mechanism is utilized to store a representation of time in a memory region of a data storage of a first microprocessor, the memory region marking mechanism marking a non-initialized data storage location.

16. The method of claim 11, wherein the one or more protected resources include at least one virtual protected resource, the at least one virtual protected resource provisioned for access by initiating an authorized computing session on a graphical user interface of a computing method.

17. The method of claim 11, wherein the secondary limited clock speed microprocessor and the master limited clock speed microprocessor each have clock speeds under 250 MHz.

18. The method of claim 11, wherein the secondary limited clock speed microprocessor is configured to intercept the authentication electrical pulses, and is configured to provision access to the one or more protected resources by generating a corresponding emulated set of electrical pulse signals for transmission to the access control management device upon receiving the instruction signal from the master limited clock speed microprocessor.

19. A non-transitory computer readable medium, storing machine interpretable instructions which when executed, cause a processor to perform a method for controlling access to one or more protected resources, the method comprising:

receiving and decoding, at a secondary limited clock speed microprocessor coupled to a physical access control device, authentication electrical pulses from a physical token reader generated when a physical token interacts with the physical token reader to generate corresponding user identifier data values, the secondary limited clock speed microprocessor configured for transmitting electrical pulse signals to an access control management method that provisions access to the one or more protected resources;

receiving the corresponding user identifier data values at a master limited clock speed microprocessor coupled to an external authentication server and the secondary limited clock speed microprocessor, transforming the user identifier data values using a one-way function to generate a transformed representation for communication to the transformed representation to the external authentication server, receiving an access provisioning signal from the external authentication server, and transmitting an instruction signal to the secondary limited clock speed microprocessor to control the secondary limited clock speed microprocessor to provision access to the one or more protected resources, wherein the secondary limited clock speed microprocessor and the master limited clock speed microprocessor are coupled to one another across a message bus connection and a separate interrupt connection, the interrupt connection enabling uni-directional communication from the secondary limited clock speed microprocessor to the master limited clock speed microprocessor for indicating when the physical token interacts with the physical token reader, and wherein the secondary limited clock speed microprocessor is dedicated to emulating received signals from said physical token reader, and to decoding said access control provisioning signal received from said master limited clock speed microprocessor and transmitting said decoded access control provision signal to said access control management device in a format and timing that is compatible with said access control management device.

* * * * *